W. F. GRASSLER.
Improvement in Spark-Arresters, Chimneys, &c.
No. 130,034.            Patented July 30, 1872.
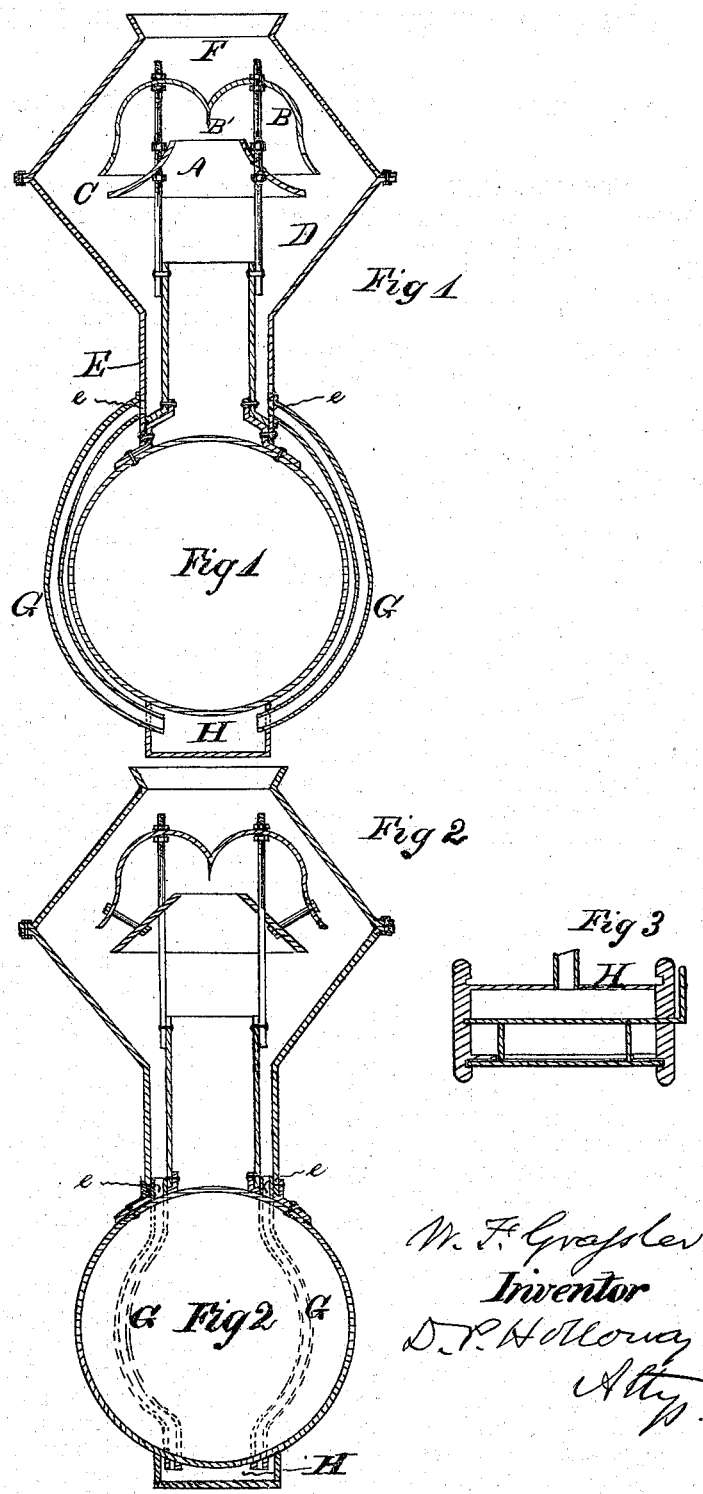

UNITED STATES PATENT OFFICE.

WILLIAM F. GRASSLER, OF MUNCY, PENNSYLVANIA.

IMPROVEMENT IN SPARK-ARRESTERS, CHIMNEYS, &c.

Specification forming part of Letters Patent No. 130,034, dated July 30, 1872.

SPECIFICATION.

Specification describing certain Improvements in Smoke-Stacks, Chimneys, and Flues, invented by WILLIAM F. GRASSLER, of Muncy, in the county of Lycoming and State of Pennsylvania.

This invention more particularly relates to that class of smoke-stacks which are used upon steam-generators and furnaces, and may also be used upon chimneys, and flues of fire-places, and fire-hearths, where it is desirable to arrest the sparks, cinders, and dust or solid particles or products of the fuel which may be carried upward into said smoke-stack, chimney, or flue by the draft of air, or by any artificial blast or means whatever which may be applied to the steam-generator or furnaces thereof, or to any fire-place or fire-hearth, so as to prevent said sparks, cinders, and dust or solid products of the fuel from escaping from or passing out from the top of said smoke-stack, chimney, or flue without arresting the draft thereof; and its novel features consist in the construction, combination, and arrangement of the several parts of which it is composed, as will be more fully described hereinafter.

Figure 1 is a sectional elevation. Fig. 2 is also a sectional elevation, showing certain modifications of my improved construction; and Fig. 3 is a detail view, showing the box for the reception of sparks, cinders, &c.

In constructing spark-arresters of this character I form the inside or spark and dust chamber of either wrought or cast iron or of copper, or of any suitable metal. I form on the outside of the spark and dust chamber an air or draft chamber, constructed of either wrought or cast iron, or of any suitable metal—boiler and sheet iron being very suitable for this chamber. These chambers, when constructed, may be placed on the top and around any smoke-stack, chimney, or flue by means of bars, pillars, or piers, and bolts or rivets, or by any fastening suitable for that purpose. The chambers and the smoke-stack, chimney, or flue to which the chambers are applied may be of any height or size preferred or desired. At the distance of a foot, more or less, above the upper end of a smoke-stack, chimney, or flue I place a spark and dust chamber, formed by fastening with bars, pillars, or piers, and bolts or rivets, or by any suitable means, to the top of a smoke-stack, chimney, or flue, a truncated cone, A, and placing above it an inverted bowl or basin, B, connected with each other by means of bolts and nuts, or by means of bars with rivets, or by any suitable means. The sides of the inverted basin or bowl may be perforated with rectangular, square, or round holes, as shown in Fig. 1. The inverted bowl or basin B contains a peak, B′, fastened to the top of the cap or covering of said inverted bowl or basin B by any suitable means, as shown in Figs. 1 and 2. The peak must extend down into the spark and dust chamber so as to separate the sparks and cinders that pass from the smoke-stack, chimney, or flue into the spark and dust chamber, and direct them to the sides thereof, so as to prevent their return into the smoke-stack. The spark and dust chamber, consisting of the truncated cone A, the inverted bowl or basin B, and peak B′, are all to be made of any suitable metal capable of enduring heat or fire. The spark and dust chamber thus formed will have an opening, C, all round it, between the rim of the inverted bowl or basin B and the truncated cone A, opening into the air or draft chamber D and into the pipe E at the lower end of said chamber, as shown in Figs. 1 and 2; or it may be constructed by joining the rim of the inverted bowl or basin B to the base of the truncated cone A, by any suitable fastening having two or more apertures, either round or oblong, cast, cut, or punched in it, so as to admit of a free discharge of the sparks, cinders, dust, smoke, and steam from it into the air or draft chamber D, and thence, through the pipes E, into any proper receptacle. Above and around the spark and dust chamber D and the smoke-stack, chimney, or flue, I construct an air or draft chamber F by joining, by means of bolts and nuts or rivets, or by any suitable means, the bases of two frustums of cones, of either equal or unequal lengths, one of them being inverted, as shown in Figs. 1 and 2. The air or draft chamber terminates on top in a straight or flaring flue, as shown in Figs. 1 and 2. The lower end of the air or draft chamber terminates in a pipe, E, extending around the smoke-stack, chimney, or flue, to which it may be applied. When applied to the smoke-stack of the steam-generator of a locomotive or stationary engine I make an aperture, *e*, or apertures *e e* through the saddle, resting on the boiler of the engine, at a point or points where the annular pipe or chamber E intersects or rests on the boiler, so as to communicate with the pipe G or pipes G G bolted or riveted to the saddle or boiler, which pipe G or pipes G G pass through the smoke-box of the boiler into the receptacle H, as shown in Fig. 1; or the receptacle H may be dispensed with, and the contents of the pipe G or pipes G G may be emptied at any place desired. Instead of making the aperture *e* or apertures *e e* through the saddle or into the boiler of an engine, so as to pass the sparks, cinders, dust, smoke, and steam down through the smoke-box of an engine, I form an aperture, *e*, or apertures *e e* in the annular pipe or chamber E, where it intersects the saddle or rests on the boiler of an engine, by means of which the sparks, cinders, and dust, also the smoke and steam, may escape into a pipe, G, or pipes G G, which may be bolted or riveted around said aperture *e* or apertures *e e*, as shown in Fig. 1, extending the pipe G or pipes G G around the outside of the boiler and down into the receptacle H; or the receptacle H may be dispensed with, and the contents of the pipe G or pipes G G may be deposited at any place desired.

The air and draft chamber is intended not merely to allow of the escape of the smoke, steam, and gas by means of the opening between the top of a smoke-stack, chimney, or flue and the bottom of the spark and dust chamber, but is intended to provide for a free passage of air so as to aid in producing combustion, and also, by means of the pipes and apertures, to carry the sparks, cinders, and dust, and so much of the smoke and steam as may pass downward, into a proper receptacle, and thus prevent the sparks and cinders from returning into the smoke-stack, chimney, or flue to be beaten into dust, as is the operation of other spark-arresters. The pipes to be used may be made of any suitable metal, or of any desirable form or size. The receptacle H, as shown in Fig. 3, may be made cylindrical, or of any desired form, and placed at any convenient point. In order to empty the receptacle H of its contents without stopping a locomotive-engine for that purpose I pass a diameter rod or bar through its greatest length, having finger-rods fastened to it inside of the receptacle H, and placed at right angles to the diameter-rod, which finger-rods are attached to a sliding door or gate placed in the receptacle H. The diameter-rod has on the one end of it, on the outside of the receptacle, a lever, to which a rod or rods are attached, extending over or along the boiler back to the engine-room, where the sliding door or gate of the receptacle may be operated by the locomotive engineer or fireman so as to empty the receptacle H of its contents when desired. By letting loose of the rod operating the lever the door or gate will close by force of gravitation, and thus close the receptacle H; all of which may be made of any suitable metal or of any desired size or form.

The advantages arising from this form of construction are that it is cheap, durable, and easily attached to any form of smoke-stack, chimney, or flue, effectually arresting fire, cinders, and dust, and depositing them in a safe receptacle, thus obviating a great source of annoyance to passengers in railway cars, and effectually protecting not only the property along the route of a railroad from destruction by sparks and cinders, but aids in protecting and preserving the paint, varnish, and furniture of railway cars.

What I claim as my invention, and desire to secure by Letters Patent, is—

1. The combination of the truncated cone A and the bowl or basin B, whereby the annular opening in the spark and dust chamber is formed, substantially as and for the purpose specified.

2. The pipe G or pipes G G, in combination with the cylindrical chamber E in the stack and the receptacle H, substantially as and for the purpose set forth.

3. The receptacle H, when provided with a sliding door or gate, arranged to be operated from the engineer's position on the engine, substantially as and for the purpose set forth.

In testimony whereof I have signed my name to this specification in the presence of two subscribing witnesses.

WILLIAM F. GRASSLER.

Witnesses:
G. W. RANKIN,
W. F. GOODWIN.